US010284000B2

(12) United States Patent
Pais et al.

(10) Patent No.: US 10,284,000 B2
(45) Date of Patent: May 7, 2019

(54) ELECTROMAGNETIC COUPLING INTERFACE AND METHOD FOR MANAGING AN ELECTROMAGNETIC COUPLING CAPABILITY

(71) Applicant: Motorola Mobility LLC, Chicago, IL (US)

(72) Inventors: Martin Pais, North Barrington, IL (US); David Winkler, Aurora, IL (US); Gary Cunningham, Western Springs, IL (US)

(73) Assignee: Motorola Mobility LLC, Chicago, IL (US)

( * ) Notice: Subject to any disclaimer, the term of this patent is extended or adjusted under 35 U.S.C. 154(b) by 138 days.

(21) Appl. No.: 15/279,396

(22) Filed: Sep. 28, 2016

(65) Prior Publication Data

US 2018/0090968 A1    Mar. 29, 2018

(51) Int. Cl.
*H02J 7/00*  (2006.01)
*H02J 7/02*  (2016.01)
*H02J 50/12*  (2016.01)
*H02J 50/90*  (2016.01)
*H02J 50/40*  (2016.01)
*H01F 38/14*  (2006.01)
*H04B 5/00*  (2006.01)

(52) U.S. Cl.
CPC ............. *H02J 7/025* (2013.01); *H01F 38/14* (2013.01); *H02J 50/12* (2016.02); *H02J 50/40* (2016.02); *H02J 50/90* (2016.02); *H04B 5/0037* (2013.01); *H04B 5/0081* (2013.01)

(58) Field of Classification Search
USPC ........................................ 320/107, 108, 137
See application file for complete search history.

(56) References Cited

U.S. PATENT DOCUMENTS

| 8,907,619 | B2* | 12/2014 | Shukuya | G12B 5/00 |
| | | | | 320/108 |
| 9,319,855 | B2* | 4/2016 | Eaton | H02J 7/0052 |
| 9,691,873 | B2* | 6/2017 | Rogers | H01L 29/66 |
| 2006/0109071 | A1* | 5/2006 | Thongsouk | H01F 17/0033 |
| | | | | 336/200 |
| 2007/0182367 | A1* | 8/2007 | Partovi | H01F 5/003 |
| | | | | 320/108 |

(Continued)

OTHER PUBLICATIONS

Sun et al. "Buckled and Wavy Ribbons of GaAs for High-Performance Electronics on Elastomeric Substrates" Advanced Materials, 2006.*

(Continued)

*Primary Examiner* — Brian Ngo
(74) *Attorney, Agent, or Firm* — Lawrence J. Chapa

(57) ABSTRACT

The present application provides an electromagnetic coupling interface and a method for managing an electromagnetic coupling capability relative to a particular charge location with an electromagnetic coupling interface. The electromagnetic coupling interface includes a carrier substrate including two or more moveably coupled segments, the carrier substrate having at least two use positions, where in each use position the two or more moveably coupled segments have a different spatial arrangement. The electromagnetic coupling further includes two or more sets of conductors, where each set of conductors is associated with a respective one of the two or more moveably coupled segments of the carrier substrate and is associated with one or more coils in each of the at least two use positions.

20 Claims, 14 Drawing Sheets

(56) References Cited

U.S. PATENT DOCUMENTS

| | | | | |
|---|---|---|---|---|
| 2009/0096413 A1* | 4/2009 | Partovi | ............... | H01F 5/003 |
| | | | | 320/108 |
| 2010/0270970 A1* | 10/2010 | Toya | ............... | H02J 7/0027 |
| | | | | 320/108 |
| 2012/0119708 A1* | 5/2012 | Toya | ............... | H01F 38/14 |
| | | | | 320/137 |
| 2012/0212178 A1* | 8/2012 | Kim | ............... | H02J 50/10 |
| | | | | 320/108 |
| 2012/0235636 A1* | 9/2012 | Partovi | ............... | H02J 7/025 |
| | | | | 320/108 |
| 2013/0293025 A1* | 11/2013 | Xu | ............... | H02J 17/00 |
| | | | | 307/104 |
| 2014/0254142 A1* | 9/2014 | Ward | ............... | G06F 1/16 |
| | | | | 362/103 |
| 2016/0141884 A1* | 5/2016 | Lee | ............... | H02J 17/00 |
| | | | | 307/104 |
| 2016/0322850 A1* | 11/2016 | Yeh | ............... | H02J 7/025 |
| 2017/0025905 A1* | 1/2017 | Pan | ............... | H02J 50/80 |
| 2017/0353046 A1* | 12/2017 | Chen | ............... | H02J 50/12 |

OTHER PUBLICATIONS

Martin R. Pais, et al., "Coil and Method for Increasing the Degree of an Electromagnetic Coupling", U.S. Appl. No. 15/083,824, filed Mar. 29, 2016.

Panasonic QE-TM101 Pad, youtube video, "https://www.youtube.com/watch?v=an7IWob6ZrE".

\* cited by examiner

ELECTROMAGNETIC COUPLING INTERFACE AND METHOD FOR MANAGING AN ELECTROMAGNETIC COUPLING CAPABILITY

FIELD OF THE APPLICATION

The present disclosure relates generally to coils for use in facilitating an electromagnetic coupling with at least another coil, and more particularly, to a carrier substrate having a plurality of coupled segments, each associated with respective ones of the coils, which can transition between multiple use positions, that causes the coupled segments to have varying spatial arrangements which can alter the degree of electromagnetic coupling with the other coil(s).

BACKGROUND

Electromagnetic/inductive mode (tightly coupled) or resonant mode (loosely coupled) coupling includes the near field wireless transmission of electrical energy between two conductors, such as magnetically coupled coils. The amount of electromagnetic/inductive coupling between the two conductors is measured by their mutual inductance, which in many instances can be determined by the formula $M=k*(Ls*Lp)^{0.5}$, where k is the coupling factor, and Ls and Lp are the inductance for a secondary side and a primary side conductor, respectively. The amount of electromagnetic/resonant coupling between two conductors is measured by their figure of Merit "U", which in many instances can be determined by the formula $U=k*(Qs*Qp)^{0.5}$, where k is the coupling factor, and Qs and Qp are the quality factor for a secondary side and a primary side conductor, respectively. More specifically, the figure of Merit "U" is the efficiency of coupling between two coils resonant at the same natural frequency, where the respective quality factor, $Q(w)=w*$max energy stored/power lost, with w being equal to $2\pi f$, where f is the frequency. In each instance, the power transfer can be increased by increasing the coupling factor, k.

The coupling factor, k, between the two conductors can be increased by winding them into coils and placing them relatively proximate to one another in an orientation in which a magnetic field induced in one of the coils intersects and/or passes through the other one of the two coils. The transmission of electrical energy via electromagnetic/inductive/resonant coupling has been used to exchange information as well as to transfer energy between two objects. Transferring energy via electromagnetic/inductive/resonant coupling is also sometimes referred to as wireless charging, and is a feature that is being increasingly supported in portable electronic devices.

The various technologies associated with wireless charging generally involve the arrangement of the device to be charged with a charging station, such that an electromagnetic/inductive/resonant coupling interaction is created between a coil associated with the device to be charged and a coil associated with the charging station. The electromagnetic/inductive/resonant coupling interaction generally involves an electromagnetic field produced by a current in the coil associated with the charging station which is intended to induce a voltage and/or current in the coil associated with the device to be charged. The induced current is in theory of a sufficient magnitude, such that it can be collected and used to power the device and/or used to recharge a power storage element such as a battery, which can then be later used to power the device. However, the degree and/or efficiency with which power can be supplied through the electromagnetic/inductive/resonant coupling is often dependent upon the proximity, orientation and arrangement of the two sets of coils and/or conductors, which are respectively associated with the charging device and the device to be charged.

The charging device could be expected to interact with multiple different types of devices, where each device might have a different arrangement with its own unique coil configuration including an associated size and shape. In other words, different types of devices may have different sized sets of coils, where for example a lap top or tablet computer might have a relatively larger sized set of coils, while a cellular radio frequency telephone might have a relatively smaller sized set of coils for supporting an electromagnetic/inductive/resonant coupling. An electric automobile, that might support wireless charging might have a still larger set of coils. In at least some instances, a charging device might be expected to separately or simultaneously support the supply of power to each of multiple types of devices. As such, there is a desire to be able to manage, to at least some degree, the ability of the wireless charger to electromagnetically and/or inductively interact with the device to be charged.

The present inventors have recognized that, because the charging device and/or the device to be charged may be expected to interact in multiple different types of charging environments, where the charging device and/or device(s) to be charged may have varying configurations, a charging device and/or a device to be charged that has a coil configuration that can be more readily adjusted and adapted to different types of charging environments may be beneficial.

SUMMARY

The present application provides an electromagnetic coupling interface. The electromagnetic coupling interface includes a carrier substrate including two or more moveably coupled segments, the carrier substrate having at least two use positions, where in each use position the two or more moveably coupled segments have a different spatial arrangement. The electromagnetic coupling further includes two or more sets of conductors, where each set of conductors is associated with a respective one of the two or more moveably coupled segments of the carrier substrate and is associated with one or more coils in each of the at least two use positions.

In at least one embodiment, a degree of alignment between different ones of the two or more sets of conductors changes as the carrier substrate transitions between the at least two use positions.

The present application further provides a method for managing an electromagnetic coupling capability relative to a particular charge location with an electromagnetic coupling interface. The electromagnetic coupling interface includes a carrier substrate with multiple moveably coupled segments having at least two use positions, where in each use position the multiple moveably coupled segments have a different spatial arrangement. The electromagnetic coupling interface further includes multiple sets of conductors, where each set of conductors is respectively associated with one of the multiple moveably coupled segments. The method includes detecting the present use position of the multiple moveably coupled segments of the carrier substrate. A signal is then applied to each of the multiple sets of conductors dependent upon the present use position which has been detected.

In at least one embodiment, the method further includes determining the type of device interacting with the electromagnetic coupling interface and the ability of the device to receive a charge at the particular charge location via the electromagnetic coupling interface. A preferred use position from the at least two use positions is then identified, and the carrier substrate and the associated multiple moveably coupled segments are configured between the at least two use positions into the preferred use position. The signal applied to each of the multiple sets of conductors is dependent upon the detected configured use position and the determined type of device and the ability of the device to receive a charge.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 2:
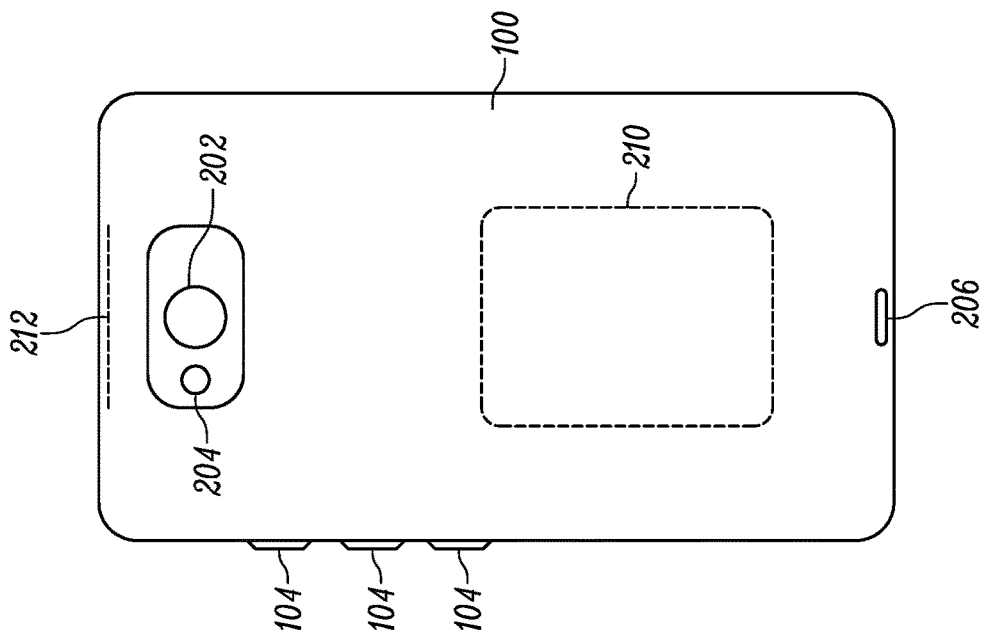
FIG. 2 is a back view of an exemplary portable electronic device.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

Figure 1:
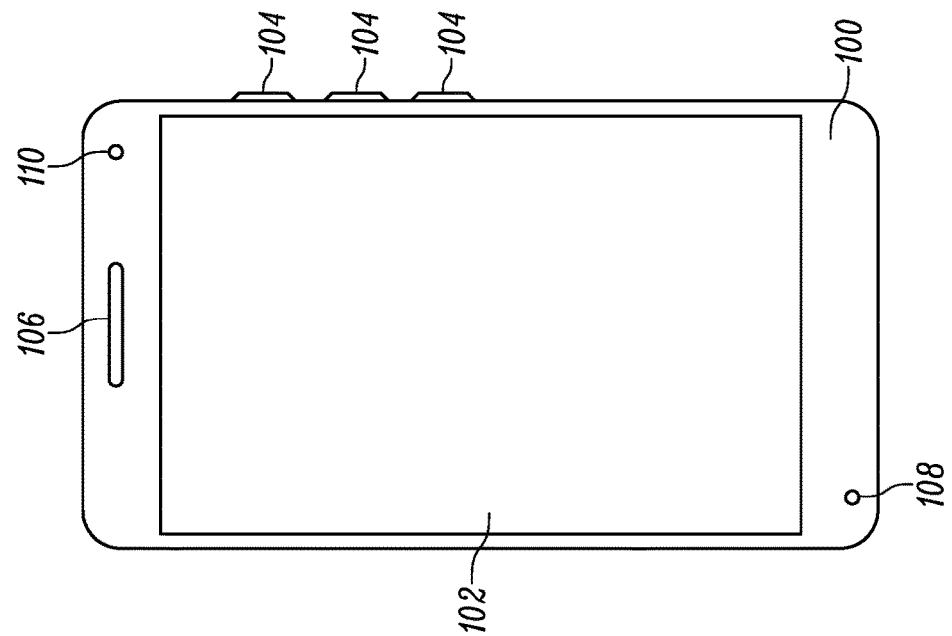
FIG. 1 is a front view of an exemplary portable electronic device.

FIG. 1 illustrates a front view of an exemplary portable electronic device 100. While in the illustrated embodiment, the type of portable electronic device shown is a radio frequency cellular telephone, which incorporates electromagnetic coupling, such as wireless charging capabilities and/or near field communications, other types of devices that incorporate electromagnetic coupling are also relevant to the present application. In other words, the present application is generally applicable to portable electronic devices beyond the type being specifically shown. A couple of additional examples of suitable portable electronic devices that may additionally be relevant to the present application in the incorporation and management of multiple types of wireless charging and near field communications in a portable electronic device can include a tablet, a cordless telephone, a selective call receiver, an audio player, a gaming device, a personal digital assistant, a wireless headset, as well as any other form of portable electronic device that one might at least sometimes carry around on one's person for which it might be desirable to wirelessly charge and/or engage in one or more forms of near field communications. As noted previously, the portable electronics involving the incorporation and management of at least one or more types of wireless charging and near field communication can also be included in an automobile, such as an electric car.

In the illustrated embodiment, the radio frequency cellular telephone includes a display 102 which covers a large portion of the front facing. In at least some instances, the display can incorporate a touch sensitive matrix, that facilitates detection of one or more user inputs relative to at least some portions of the display, including interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for actuation. In addition to one or more virtual user actuatable buttons or keys, the device 100 can include one or more physical user actuatable buttons 104. In the particular embodiment illustrated, the device has three such buttons located along the right side of the device.

The exemplary portable electronic device, illustrated in FIG. 1, additionally includes a speaker 106 and a microphone 108 in support of voice communications. The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker 106 may also include the capability to also produce a vibratory effect. However, in some instances, the purposeful production of vibrational effects may be associated with a separate element, not shown, which is internal to the device. Generally, the speaker 106 is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110.

FIG. 2 illustrates a back view of the exemplary portable electronic device 100, illustrated in FIG. 1. In the back view of the exemplary portable electronic device, the three physical user actuatable buttons 104, which are visible in the front view, can similarly be seen. The exemplary hand held electronic device 100 additionally includes a back side facing camera 202 with a flash 204, as well as a serial bus port 206, which is generally adapted for receiving a cable connection, and which can be used to receive data and/or power signals. Still further, the illustrated embodiment includes an area 210 proximate the back side surface within which one or more coils, such as one or more loop antennas, can be located. The one or more coils could be adapted for supporting such functions as wireless charging and/or near field communications. Additionally, the one or more coils can be located internal to the device, often just below the back side surface of the device 100.

In addition and/or alternative to the one or more coils proximate the back side surface of the device 100 within the identified area 210, the device can include a conductor segment 212 proximate the top of the device, which can be arranged for supporting wireless charging and/or near field communications. In each instance, the one or more coils proximate the back side surface and/or the top side conductor segment 212 can be used to transfer energy via an electromagnetic/inductive/resonant coupling with one or more sets of conductors associated with another device.

Figure 3:
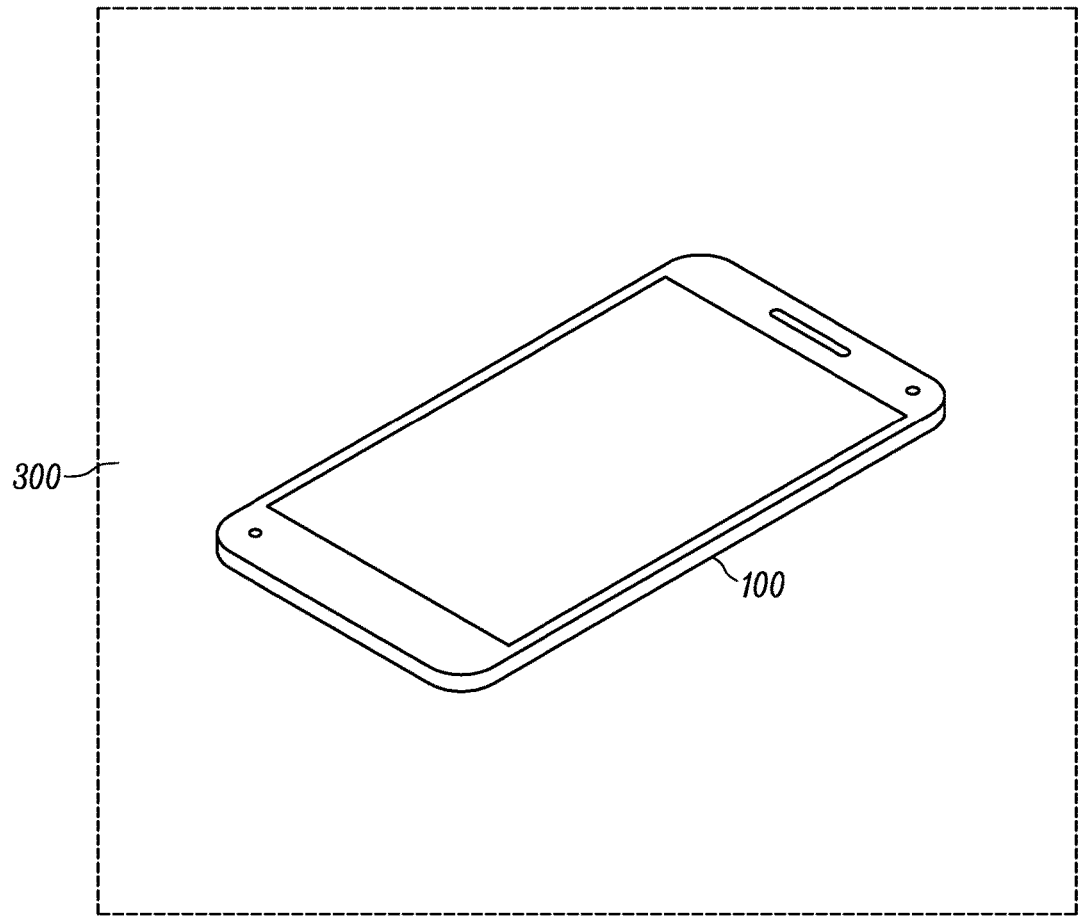
FIG. 3 is a partial perspective view of an exemplary portable electronic device in contact with a substantially flat surface.

FIG. 3 illustrates a partial perspective view of an exemplary portable electronic device 100 in contact with a substantially flat surface 300. In at least some instances, the substantially flat surface 300 could be part of a wireless charging device, which similar to the exemplary portable electronic device 100 can have one or more conductors and/or coils, which are present just below the surface. The one or more conductors and/or coils associated with the flat surface 300 of a wireless charging device are intended to interact with the one or more conductors and/or coils of the portable electronic device 100, so as to allow for an electromagnetic coupling between the two sets of one or more conductors/coils.

Figure 4:
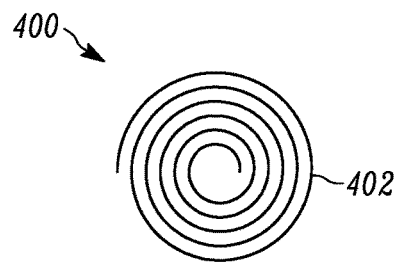
FIG. 4 is a front view of an exemplary coil for a relatively smaller device.
Figure 5:
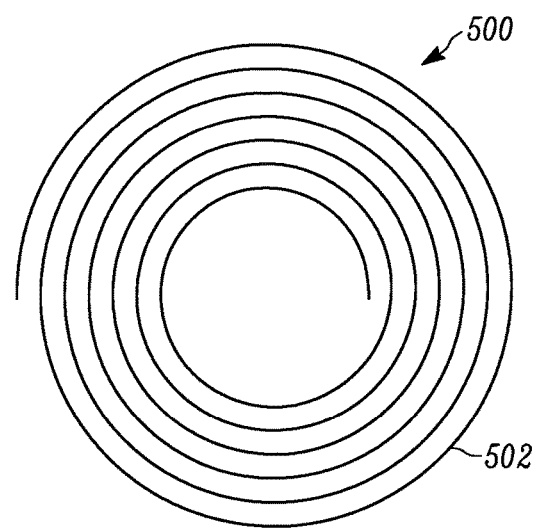
FIG. 5 is a front view of an exemplary coil for a relatively larger device.

FIGS. 4 and 5 illustrate front views of an exemplary coils for different size devices, where FIG. 4 illustrates a front view 400 of a coil 402 suitable for a relatively smaller device, and FIG. 5 illustrates a front view 500 of a coil 502 for a relatively larger device. More specifically, FIG. 4 could be representative of a coil 402 for use in connection with a hand-held device such as a cellular radio frequency telephone, and FIG. 5 could be representative of a coil 502 for use in connection with a lap top computer. Generally, a smaller coil will better couple to a similarly sized and shaped smaller coil, and a larger coil will better couple to a similarly sized and shaped larger coil. While generally the power transfer efficiency will be better when the transmit and receive coils are of a similar size and shape, in order to be supportive of multiple different overall shapes and sizes of coils, an ability to arrange one or more sets of coils so as to control the overall shape of the area of electromagnetic/inductive/resonant coupling or interaction would be helpful.

Figure 6:
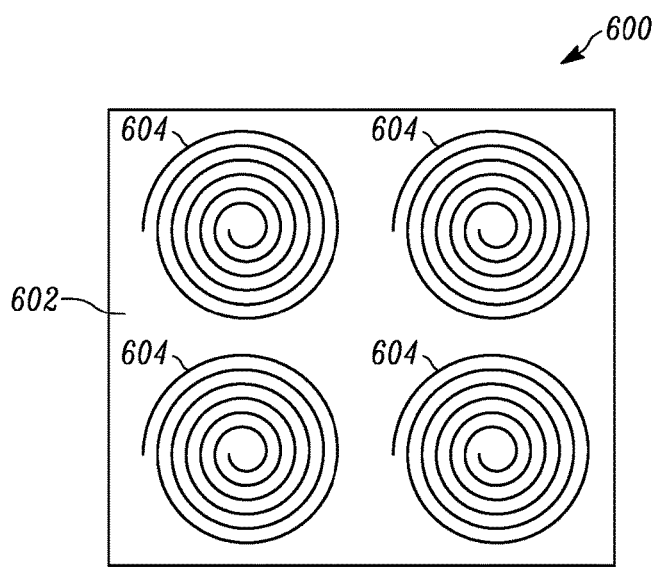
FIG. 6 is a front view of a carrier substrate including multiple sets of conductors in the form of multiple coils.

In an attempt to accommodate both smaller and larger sized coils an arrangement including multiple smaller coils may be beneficial. One example of such an arrangement is illustrated in FIG. 6, which includes a front view 600 of a carrier substrate 602 including multiple sets of conductors in the form of multiple ones of the relatively smaller coils 604. Each of the multiple sets of conductors is associated with a different portion or segment of the carrier substrate 602. By including conductors in the form of smaller coils in the overall configuration, a smaller coil 402 associated with a device that is interacting with the coils 604 of the carrier substrate 602 can interact better with individual ones of the coils 604. Furthermore, the arrangement of the multiple smaller coils 604 can as a group interact reasonably well with a larger coil 502. In at least some instances where the group of multiple smaller coils 604 together are intended to interact with a larger coil 502, it will be beneficial for each of the smaller coils 604 to be energized by the same transmit driver, where the magnetic field produced by each of the smaller coils 604 will be in the same general direction and within the footprint of the larger coil 502, so that the respective electromagnetic fields being produced are generally additive or cumulative.

In at least some instances all or portions of the carrier substrate 602 can transition between multiple use positions, where different portions or segments of the carrier substrate, as well as the conductors associated with each of the segments, can change their spatial proximity relative to other portions or segments of the carrier substrate 602. In some instances, all or portions of the carrier substrate can be made from a hinged or flexible material, which allow at least some portions of the carrier substrate to bend or fold relative to other portions of the carrier substrate. After being folded, it is possible that some segments of the carrier substrate 602 will overlap other segments of the carrier substrate 602. In some instances the flexible portions of the carrier substrate 602 will coincide with at least portions of the substrate that correspond to predesignated fold lines.

Figure 7A:
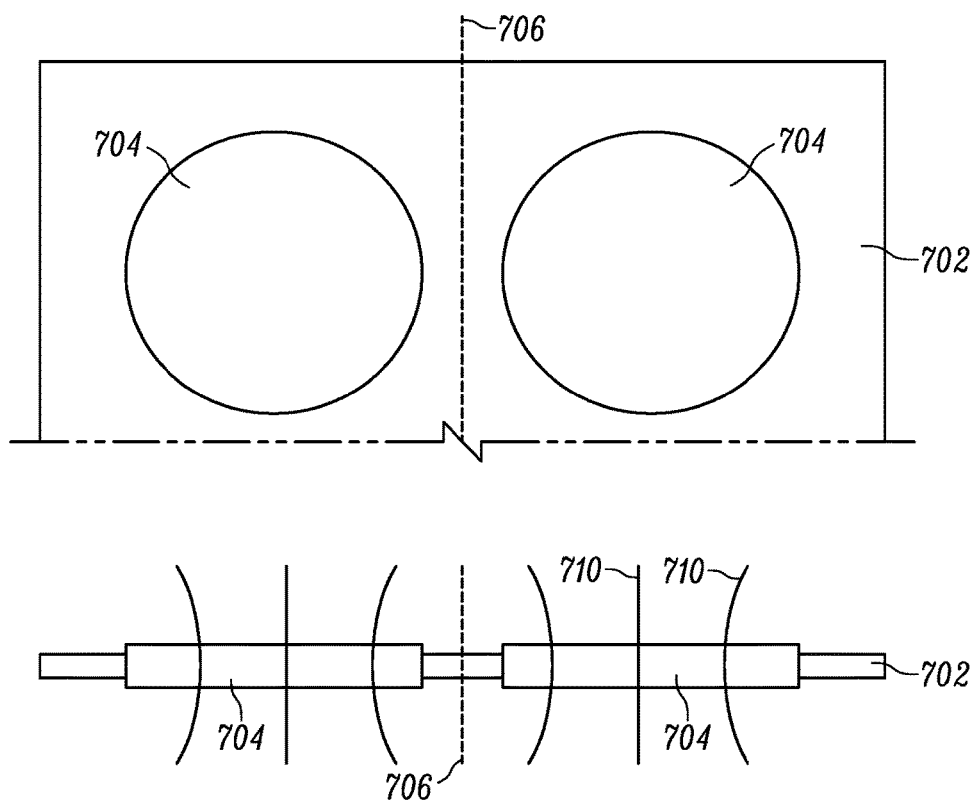
FIGS. 7A-7C are partial front views and corresponding partial side views of a carrier substrate, as the carrier substrate transitions between multiple use positions.
Figure 7B:
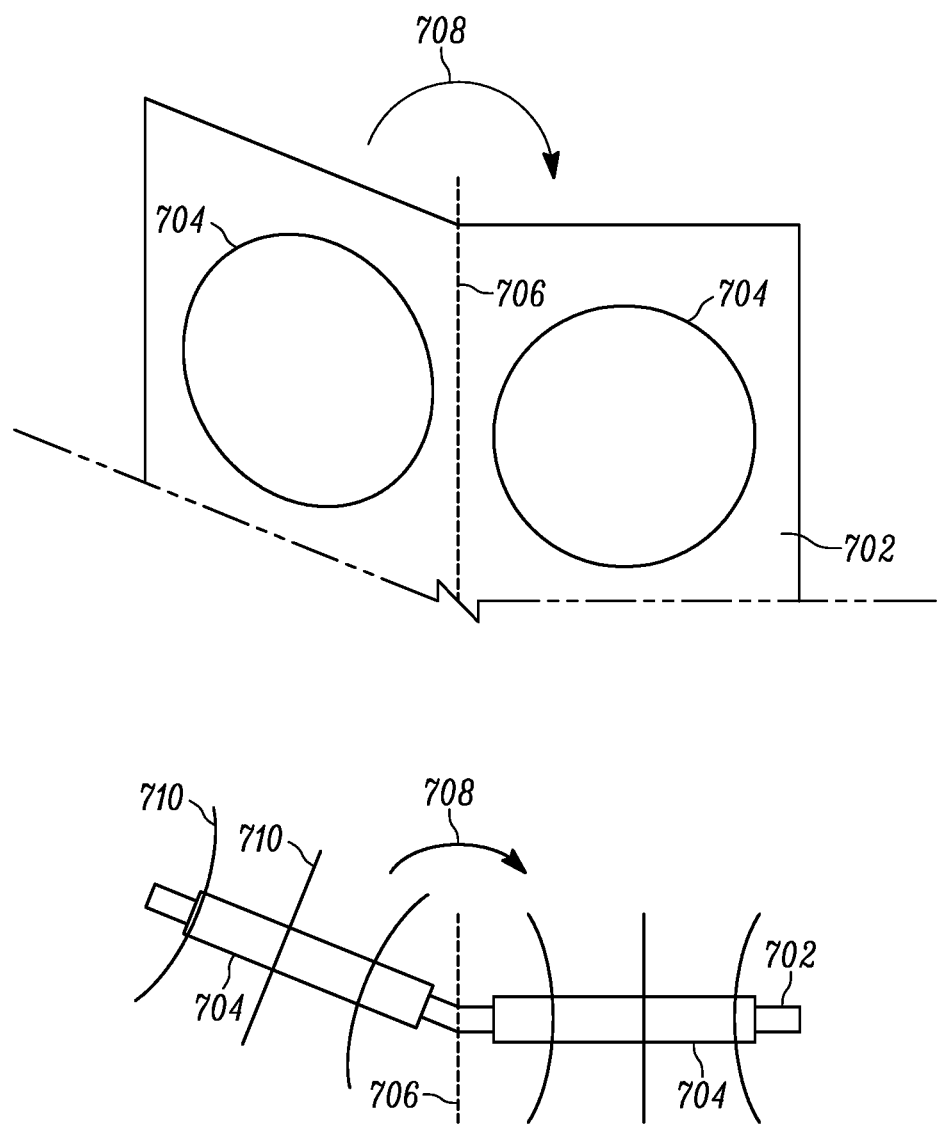
Figure 7C:
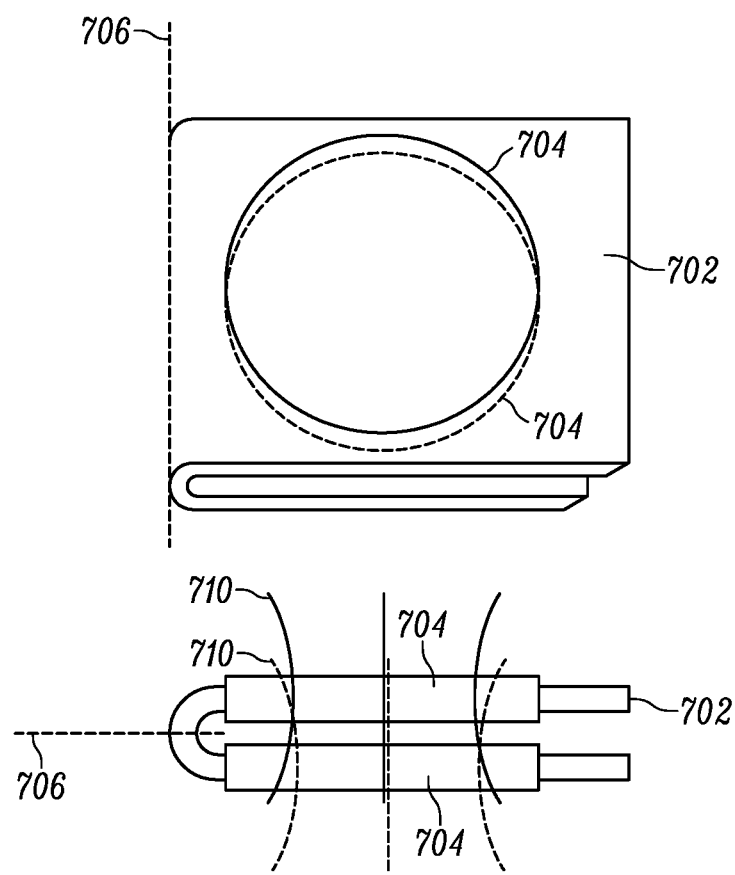

FIGS. 7A-7C illustrate partial front views and corresponding partial side views of an exemplary carrier substrate 702, as the carrier substrate 702 transitions between multiple use positions. More specifically, FIG. 7A illustrates a partial view of the exemplary carrier substrate 702 that is arranged in a position that is laid out relatively flat. In the portion of the carrier substrate 702 illustrated, the carrier substrate 702 has two sets of conductors generically identified by circular regions 704 of the carrier substrate 702 within which each of the sets of conductors are located. The carrier substrate 702 additionally includes a predesignated fold line 706 identified by a dashed line, which is located between the two circular regions 704 along which the carrier substrate 702 is adapted to be able to bend.

FIG. 7B illustrates a partial view of a carrier substrate 702 that is beginning to bend 708 along the fold line 706, and FIG. 7C illustrates a partial view of a carrier substrate 702 that has completed a bend along a fold line. Once completed each of the respective areas of the carrier substrate 702, as well as the corresponding circular regions 704, has been folded relative to one another so as to overlap.

Where the sets of conductors associated with the respective areas of the carrier substrate 702 are arranged to form a coil, a current through the coil can produce an electromagnetic field including electromagnetic field lines 710 that are generally perpendicular to the plane of the coil at or near the plane of the coil. In the folded state, generally any electromagnetic field lines 710 produced relative to one of the overlapping sets of conductors will extend through the same or similar space as the field lines 710 produced relative to the other overlapping set of conductors, as the area that are perpendicular to the overlapping set of conductors are brought into a proximity and into an alignment where the produced field lines will substantially coincide with one another. However, because the orientation of one of the sets of conductors will flip relative to the other set of conductors as part of the process of folding, it may be necessary to flip the polarity of the signal being applied or reverse the current flowing through one of the sets of conductors in order for the electromagnetic field lines being produced in each of the overlapping sets of conductors to continue to be additive.

While the folding could be managed as a manual process involving intervention on the part of a user or another external source, it is also possible that the interface could include a mechanism, which can facilitate and/or assist in producing a movement between multiple use positions including a folding motion. For example, the carrier substrate could be associated with a motor, electromagnet, and/or other mechanical movement mechanism, which might be used to selectively apply a force for assisting the carrier substrate 702 in the transition between multiple use positions. It is further possible that the carrier substrate 702 could be formed from and/or include a shape memory material, such as a shape memory alloy or polymer, that could be selectively adjusted to transition between two different shapes or structures dependent upon the presence, absence, or different amounts of an externally applied trigger stimulus. Such a transition between multiple shapes could be affected through a change in temperature, a flow of an electric current, or other type of trigger. Such an effect could supplement or replace the type of movement that might be externally induced and/or internally produced, such as by a motor, electromagnet, and/or other mechanical movement mechanism.

Furthermore, the carrier substrate 702 could have a rest shape, that can have a varying degree of resistance to a change of its shape. The resistance in change could manifest in the structure storing a spring like energy as it is caused to deviate from its preselected rest shape or structure, such that when the applied force is removed and/or relaxed, the carrier substrate 702 will attempt to return at least partially to its original rest position. In such an instance, a latching mechanism may be used to assist in holding a particular use position against the stored spring like energy resulting from a deviation from the rest position, which in order to return to the rest position would require the release of the latch.

Figure 8:
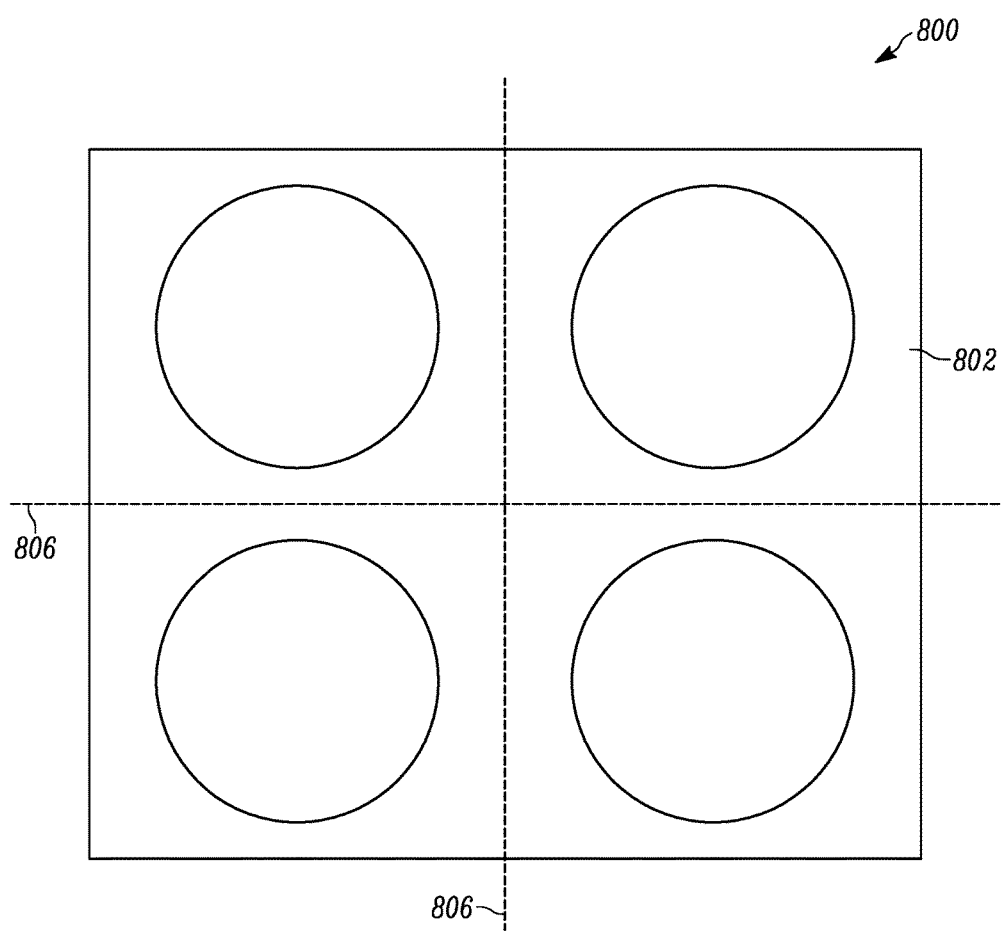
FIG. 8 is a front view of a carrier substrate including multiple fold lines across which the carrier substrate can bend between multiple use positions.

While the example in FIG. 7 illustrates the possibility of a single fold, it is possible that the structure could support multiple folds. For example, FIG. 8 illustrates a front view 800 of a carrier substrate 802 including multiple exemplary fold lines 806 across which the carrier substrate 802 can alternatively and/or together bend between the multiple use positions. Such an arrangement allows for an even larger number of areas or moveably coupled segments of the carrier substrate 802 to be selectively arranged, so as to overlap.

Figure 9A:
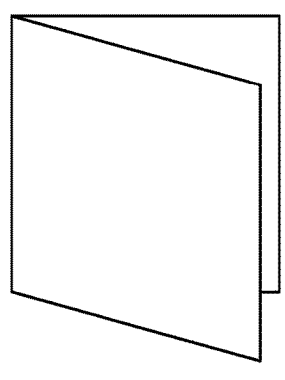
FIGS. 9A-9E are each one of multiple exemplary different use positions including different types of bendable configurations for a substantially planar carrier substrate.
Figure 9B:
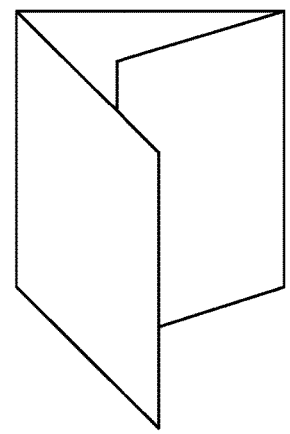
Figure 9C:
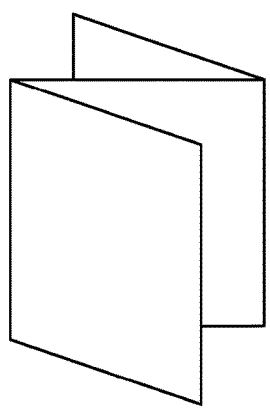
Figure 9D:
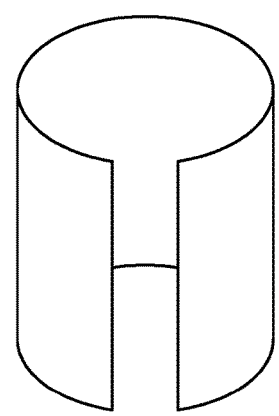
Figure 9E:
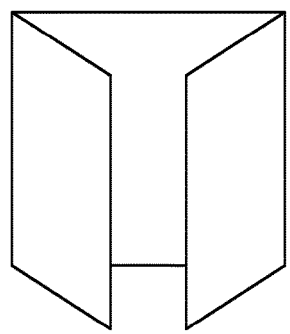

FIGS. 9A-9E each illustrate one of multiple exemplary different use positions including different types of bendable configurations for a substantially planar carrier substrate. For example, FIG. 9A illustrates a half fold, FIG. 9B illustrates a letter fold, FIG. 9C illustrates a "Z"-fold, FIG. 9D illustrates a roll fold, and FIG. 9E illustrates a gate fold.

In addition to carrier substrates that are substantially planar, the carrier substrate can take other forms. For example, the carrier substrate can take the form of a flexible ribbon or string like length of material, that can include a conductor running through the substrate, where the ribbon can be arranged between multiple use positions to support one or more configurations including one or more coils.

Figures 10A, 10B, 10C:
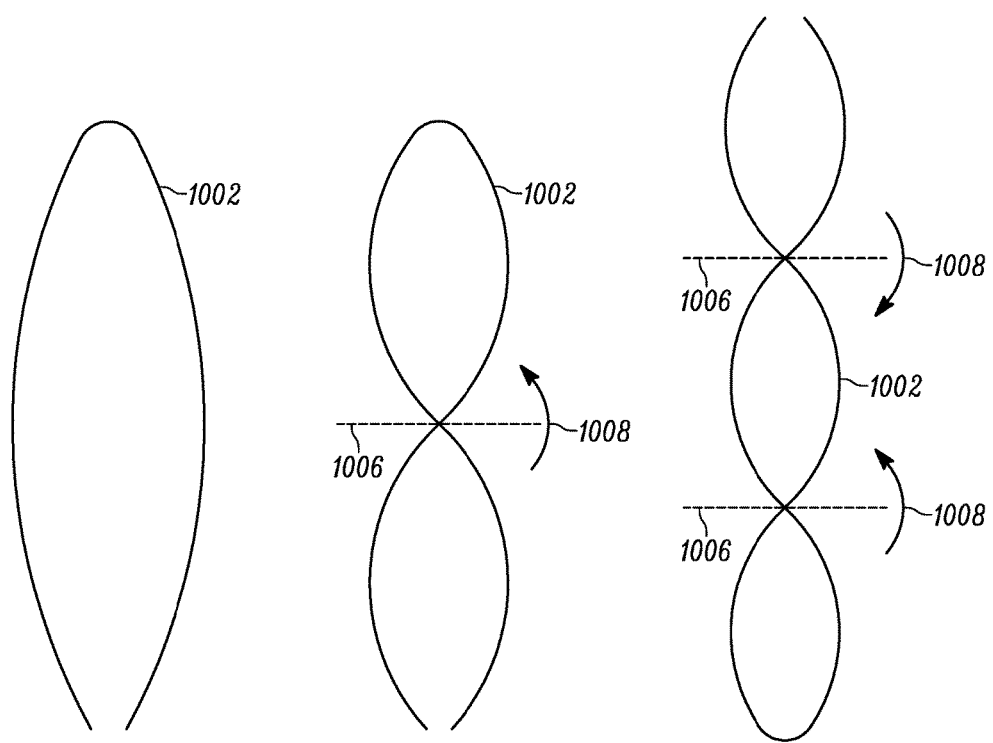
FIGS. 10A-10C are multiple exemplary arrangement of a ribbon substrate, which can include one or more fold lines for bending different sections of carrier substrate between different use positions.

FIGS. 10A-10C illustrate an electromagnetic coupling interface including multiple exemplary arrangements of a ribbon substrate 1002, which can include one or more fold lines 1006 for bending different sections of carrier substrate 1002 between different use positions. More specifically, FIG. 10A illustrates a single larger loop, while FIGS. 10B and 10C illustrate the larger loop having been twisted to form several smaller loops, which in turn can then be folded 1008 across one or more fold lines 1006 to form multiple overlapping loops. The combination of folding and twisting can sometimes preclude the need to reverse the polarity or current in at least some of the respective conductive segments.

Figure 11:
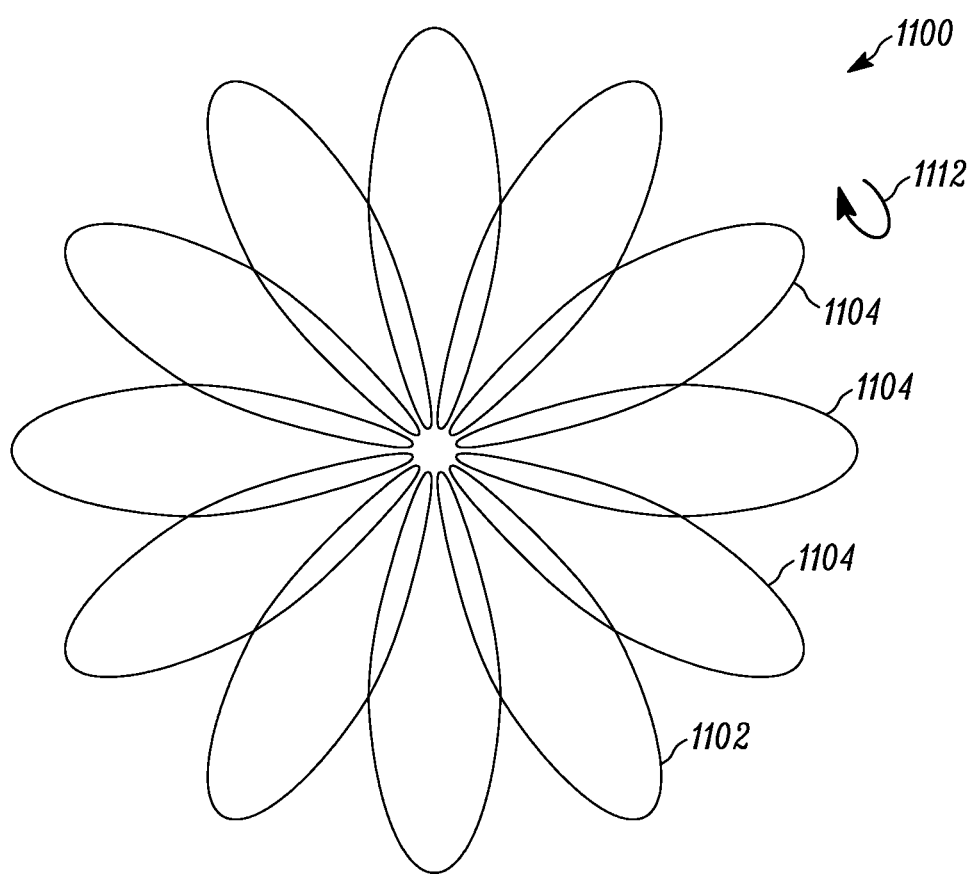
FIG. 11 is a front view of a carrier substrate having multiple conductor sections arranged in a clover leaf configuration with the leaves arranged in a horizontal arrangement that is slightly overlapping.

FIG. 11 illustrates a front view 1100 of a still further arrangement including a carrier substrate 1102 having multiple conductor sections arranged in a clover leaf configuration with the leaves 1104 arranged in a horizontal arrangement that is slightly overlapping. In at least some instances, each of the leaves could be attached to a central hub via a hinge arrangement. In other instances, the leaves can be formed via a more ribbon-like substrate, that is preshaped to form the clover-leaf like arrangement. Different portions of such a ribbon-like substrate might be more or less rigid. In at least some instances, the leaves 1104 may individually be adapted to twist 1112 from a more horizontal arrangement to a more vertical arrangement.

In the horizontal arrangement, a larger group of leaves 1104 could together support the conveyance of electromagnetic energy to a relatively larger coil structure, such as the coil structure 502, illustrated in FIG. 5. Alternatively, a smaller subset of the leaves 1104, including individual ones of the leaves, could be adapted to interface with a relatively smaller coil structure, such as the coil structure 402, illustrated in FIG. 4.

Figure 12:
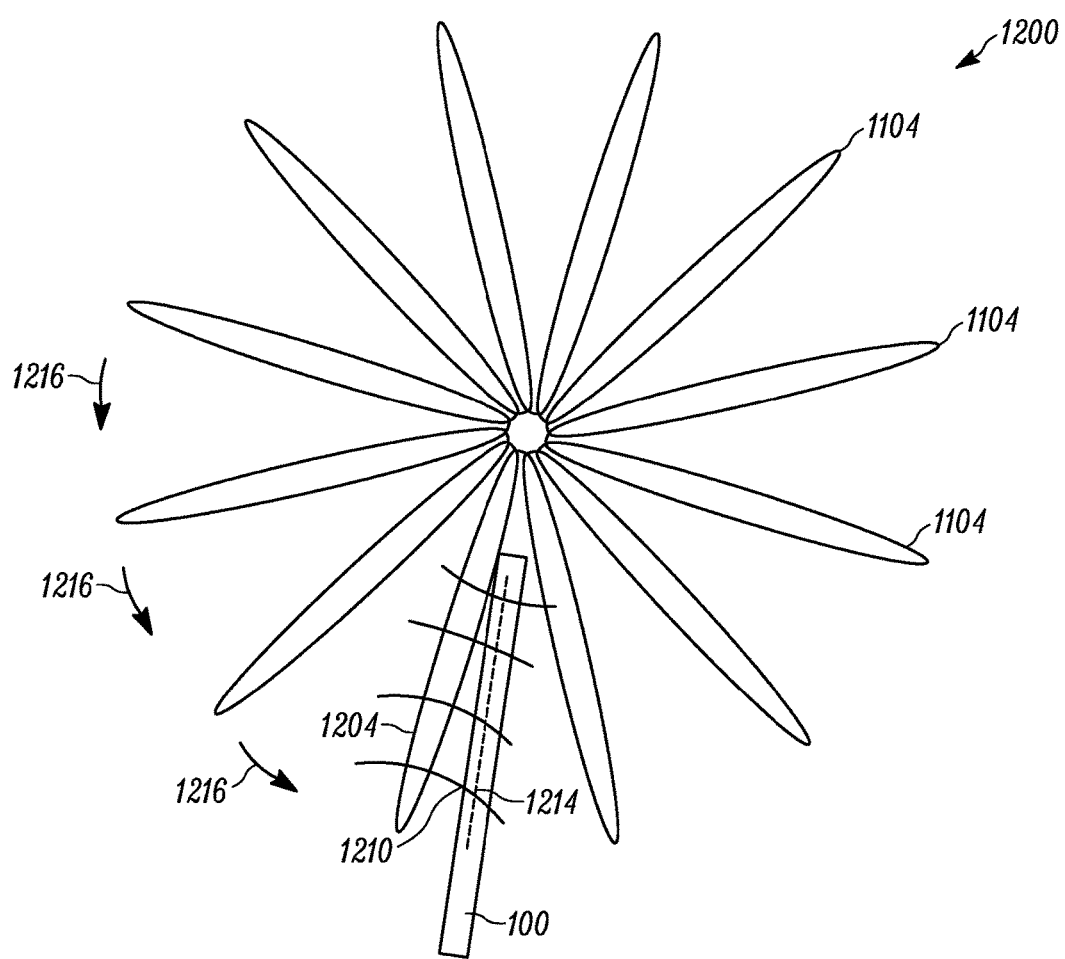
FIG. 12 is a front view of the clover leaf configuration of a carrier substrate illustrated in FIG. 11, where the leaves have been rotated from a horizontal arrangement to a vertical arrangement.
Figure 13:
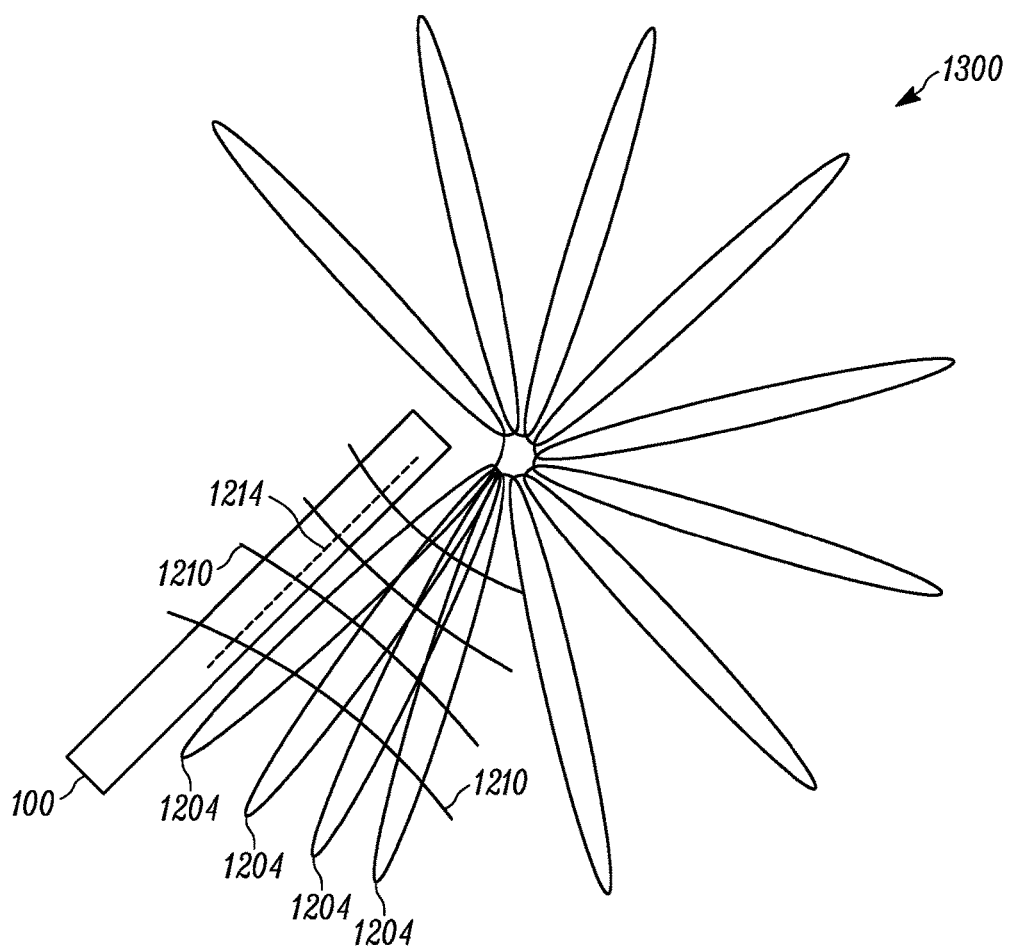
FIG. 13 is a front view of the clover leaf configuration, where at least some of the leaves are brought together after having been rotated into a vertical arrangement.

FIG. 12 illustrates a front view 1200 of the clover leaf configuration of a carrier substrate 1102 illustrated in FIG. 11, where the leaves 1104 have been rotated from a horizontal arrangement to a vertical arrangement. While the leaves 1104 have been rotated to a more vertical arrangement, a device 100 could be inserted between adjacent leaves 1104 for purposes of interacting with an electromagnetic field 1210 that is being produced through an appropriate signal being applied to the respective leaf 1104. More specifically, a coil 1214 located along one of the surfaces of the device could be arranged to interact with the electromagnetic field being produced through a proximately located leaf 1204. While in the vertical arrangement, multiple leaves can be brought together 1216, so as to allow the electromagnetic field associated with multiple leaves to better interact with a particular coil 1214 of a device 100. FIG. 13 is a front view 1300 of the clover leaf configuration, where at least some of the leaves 1204 are brought together after starting in a vertical arrangement or after having been rotated into a vertical arrangement.

While the present embodiment may be more focused on an arrangement, where the charging device has a carrier substrate that is adapted to being adjusted between multiple use positions, it is also possible that the conductors associated with the device being charged could alternatively and/or additionally have a carrier substrate with multiple respective sets of conductors, which are selectively moveable between multiple use positions. For example, where both of the devices have multiple use position that are adjustable relative to the conductors being used in is support of wireless charging and/or communications, it could be possible for both a device to be charged and a charging device to have a coil arrangement with multiple leaves, such as the arrangement illustrated in FIGS. 11-13 or other similar arrangement, that have been rotated vertically, where the leaves of the respective devices interleave in support of the electromagnetic/inductive/resonant coupling or interaction. It is also still possible that both sets of grouped leaves could be brought together, proximate to one another, so as to wirelessly couple without interleaving.

In at least some instances it can be beneficial to be able to separately control the signal that is being applied to each of the different sets of conductors. For example, there may be a desire to be able to separately turn off/on the signal being applied to one or more of the sets of conductors. In other instances, it may be beneficial to be able to separately control the polarity of the signal and/or the direction of the current. Still further, being able to separately control other aspects of the signal such as frequency, amplitude, duty cycle, wave form shape, etc., that is applied individually to each of the sets of conductors, may also be beneficial. Furthermore, the particular signal characteristics being applied to each of the sets of conductors may beneficially change dependent upon which one of a plurality of different use positions, that the carrier substrate is currently arranged.

Figure 14:
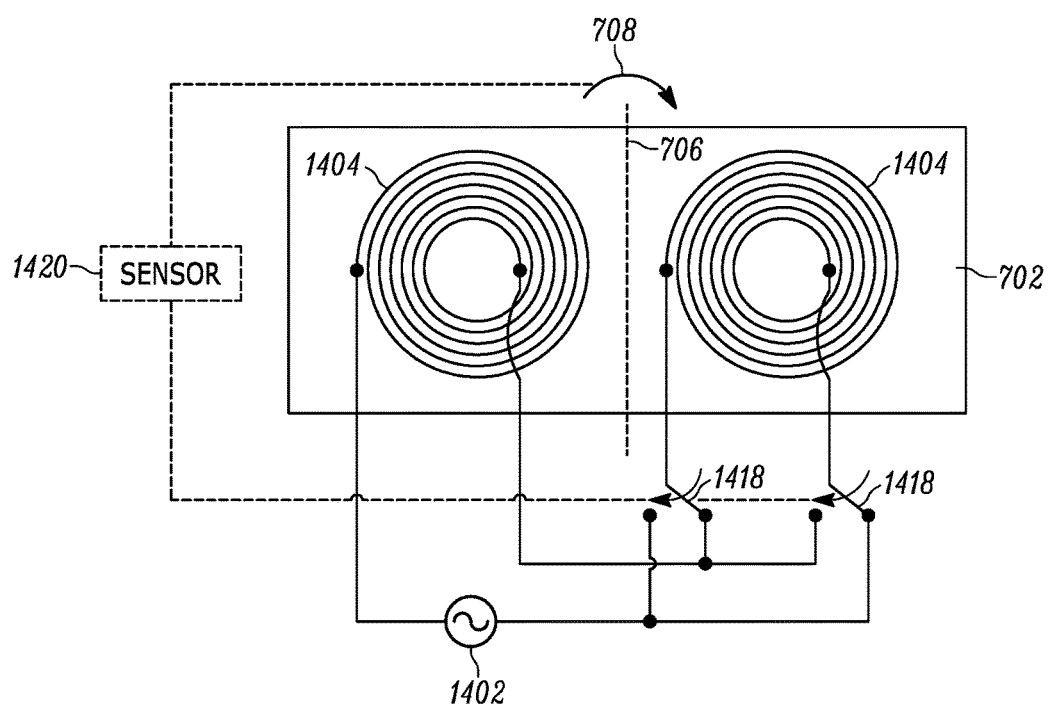
FIG. 14 is a circuit schematic of a circuit for controlling the polarity of a signal being separately applied to each of a couple of sets of conductors associated with the selective bending between multiple use positions across a fold line.

As noted above, in at least some instances, it may be beneficial to be able to switch the polarity and/or direction of the current, when the carrier substrate transitions between use positions, where the change of use position includes a fold relative to a substantially planer carrier substrate, see FIGS. 7A-7C. FIG. 14 illustrates a circuit schematic 1400 of a circuit for controlling the polarity of a signal 1402 being separately applied to each of a couple of sets of conductors associated with the selective bending 708 of a substantially planer carrier substrate 702 between multiple use positions across a fold line 706.

Where the transition between multiple use positions is managed by an internal mechanism, such as a motor, electromagnet, and/or other mechanical movement mechanism, the same signal that controls the actuation of the internal mechanism could similarly cause a pair of relays 1418 to reverse the polarity of the signal 1402 being applied to at least a respective one of the set of conductors 1404. It is alternatively possible, that a sensor 1420 could be used to detect when a change in use position is occurring or has occurred, and control the pair of relays 1418 in response to a detection of the change in use position. Using a sensor might allow for better timing as to when the change in polarity is applied, which may be useful when there is a timing difference between when the control signal is applied to the internal mechanism for effecting a change in the use position and when the use position change occurs and/or is completed. Furthermore, a sensor which more directly monitors the present use position may also be helpful, where the transition between multiple use positions involves an external source including a manual intervention on the part of the user.

Figure 15:
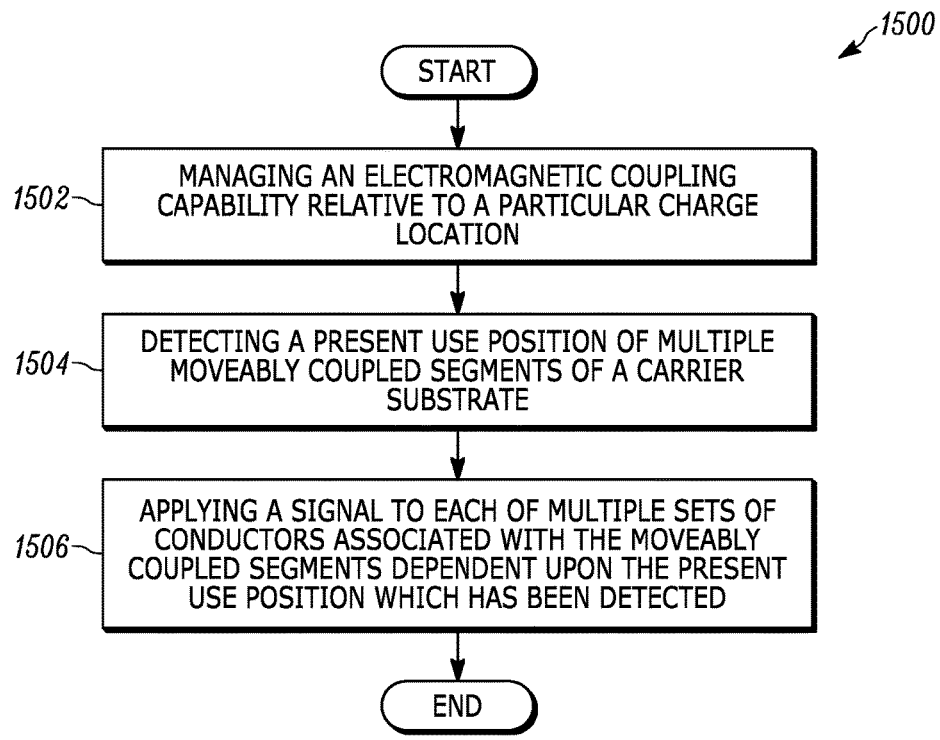
FIG. 15 is a flow diagram of a method for managing an electromagnetic coupling capability relative to a particular charge location with an electromagnetic coupling interface.

FIG. 15 illustrates a flow diagram 1500 of a method for managing 1502 an electromagnetic coupling capability relative to a particular charge location with an electromagnetic coupling interface, where the electromagnetic coupling interface includes a carrier substrate with multiple moveably coupled segments having at least two use positions, where in each use position the multiple moveably coupled segments have a different spatial arrangement. The electromagnetic coupling interface further includes multiple sets of conductors, where each set of conductors is respectively associated with one of the multiple moveably coupled segments. The method includes detecting 1504 a present use position of the multiple moveably coupled segments of the carrier substrate. A signal is then applied 1506 to each of the multiple sets of conductors dependent upon the present use position which has been detected.

In at least some instances, detecting the present use position includes detecting a transition between use positions including a fold of the carrier substrate relative to at least two of the moveably coupled segments. Furthermore, applying a signal to each of the multiple sets of conductors can include selectively reversing the polarity of the signal being applied to at least one of the sets of conductors.

Figure 16:
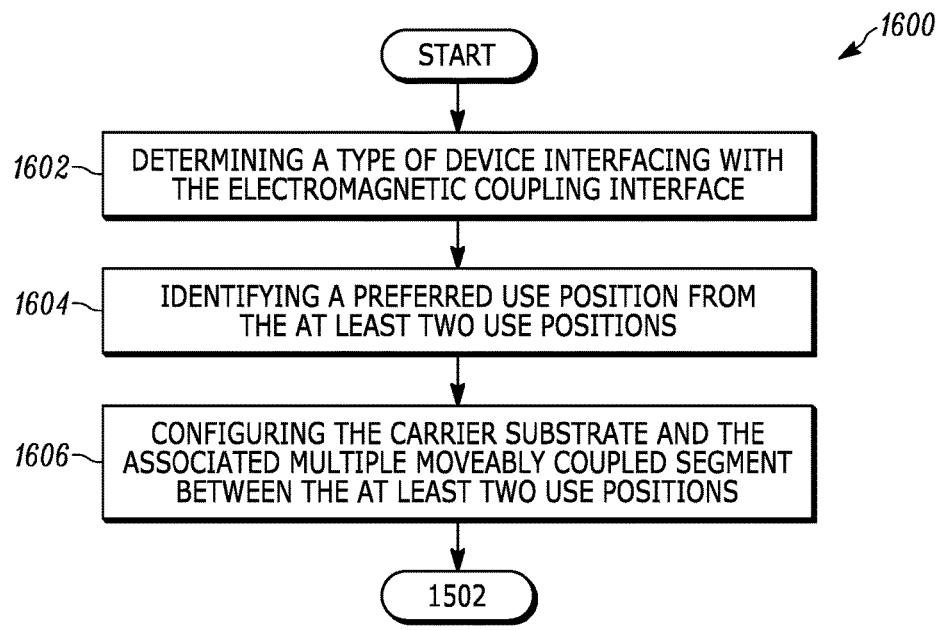
FIG. 16 is a more detailed flow diagram of the method illustrated in FIG. 15 including the determination of a preferred used position.

FIG. 16 is a more detailed flow diagram 1600 of the method illustrated in FIG. 15 including the determination of a preferred used position in connection with managing the electromagnetic coupling capability. In such an instance it may be beneficial to purposely identify a preferred use position, and correspondingly configuring the carrier substrate relative to the identified preferred use position, prior to applying an appropriate signal to each of the multiple sets of conductors, which corresponds to the selected use position. More specifically, the method further includes determining 1602 the type of device interacting with the electromagnetic coupling interface and the ability of the device to receive a charge at the particular charge location via the electromagnetic coupling interface. A preferred use position from the at least two use positions is then identified 1604, and the carrier substrate and the associated multiple moveably coupled segments are configured 1606 between the at least two use positions into the preferred use position. In such an instance, the signal being applied to each of the multiple sets of conductors is dependent upon the detected configured use position and the determined type of device and the ability of the device to receive a charge.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An electromagnetic coupling interface comprising:
   a carrier substrate including two or more moveably coupled segments, the carrier substrate having at least two electromagnetic coupling use positions, where in each electromagnetic coupling use position the two or more moveably coupled segments have a different spatial arrangement; and
   two or more sets of conductors, where each set of conductors is associated with a respective one of the two or more moveably coupled segments of the carrier substrate and is associated with one or more coils in each of the at least two electromagnetic coupling use positions; and
   wherein the carrier substrate of which the movably coupled segments are a part, folds between the at least two electromagnetic coupling use positions along one or more fold lines.

2. An electromagnetic coupling interface in accordance with claim 1 further comprising a power source for producing one or more signals that are applied to the two or more sets of conductors.

3. An electromagnetic coupling interface in accordance with claim 2, wherein each of the one or more signals are separately applied to each set of the two or more sets of conductors.

4. An electromagnetic coupling interface in accordance with claim 3, wherein each of the separately applied one or more signals are at least one of independently switchable between on and off, have a polarity which is independently controllable, or have a frequency which is independently controllable.

5. An electromagnetic coupling interface in accordance with claim 1, wherein a degree of alignment between different ones of the two or more sets of conductors changes as the carrier substrate transitions between the at least two electromagnetic coupling use positions.

6. An electromagnetic coupling interface in accordance with claim 5, wherein the degree of alignment between different ones of the two or more sets of conductors changes the amount of interaction between the fields produced by one or more signals being applied to the two or more sets of conductors.

7. An electromagnetic coupling interface in accordance with claim 1, wherein each set of conductors associated with one or more coils in each of the at least two electromagnetic coupling use positions includes at least one of the set of conductors including one or more coils in each of the at least two use positions.

8. An electromagnetic coupling interface in accordance with claim 1, wherein each set of conductors associated with one or more coils in each of the at least two electromagnetic coupling use positions includes at least one of the set of conductors including one or more coils in at least one of the at least two electromagnetic coupling use positions and including being part of one or more coils in at least another one of the at least two electromagnetic coupling use positions.

9. An electromagnetic coupling interface in accordance with claim 8, wherein the carrier substrate is a ribbon.

10. An electromagnetic coupling interface in accordance with claim 1, wherein the moveably coupled segments of the carrier substrate are coupled together via a hinged connection.

11. An electromagnetic coupling interface in accordance with claim 1, wherein at least one of the one or more fold lines is between two adjacent segments of the two or more moveably coupled segments.

12. An electromagnetic coupling interface in accordance with claim 11, wherein when the carrier substrate is folded across the at least one of the one or more fold lines, the sets of conductors associated with each of the two adjacent segments will overlap at least partially.

13. An electromagnetic coupling interface in accordance with claim 11, wherein when the carrier substrate is unfolded across the at least one of the one or more fold lines, the sets of conductors associated with each of the two adjacent segments will substantially not overlap.

14. An electromagnetic coupling interface in accordance with claim 11, wherein the set of conductors associated with one of the two adjacent segments of the carrier substrate couples to a power source through a selectable polarity switching circuit, which switches the polarity of the signal being applied to the set of conductors associated with the one of the two adjacent segments of the carrier substrate, when the carrier substrate is folded across the fold line.

15. An electromagnetic coupling interface in accordance with claim 1, wherein the one or more fold lines includes multiple fold lines; and wherein one of the multiple fold lines is across two already folded moveably coupled segments of the carrier substrate.

16. An electromagnetic coupling interface in accordance with claim 1, which is incorporated as part of a wireless charging device.

17. A method for managing an electromagnetic coupling capability relative to a particular charge location with an electromagnetic coupling interface including a carrier substrate with multiple moveably coupled segments having at least two electromagnetic coupling use positions, wherein the carrier substrate of which the movably coupled segments are a part, folds between the at least two electromagnetic coupling use positions along one or more fold lines, where in each electromagnetic coupling use position the multiple moveably coupled segments have a different spatial arrangement, and multiple sets of conductors, where each set of conductors is respectively associated with one of the multiple moveably coupled segments, the method comprising:

detecting the present electromagnetic coupling use position of the multiple moveably coupled segments of the carrier substrate; and applying a signal to each of the multiple sets of conductors dependent upon the present electromagnetic coupling use position which has been detected.

18. A method in accordance with claim 17 further comprising:

determining the type of device interacting with the electromagnetic coupling interface and the ability of the device to receive a charge at the particular charge location via the electromagnetic coupling interface;

identifying a preferred electromagnetic coupling use position from the at least two electromagnetic coupling use positions; and configuring the carrier substrate and the associated multiple moveably coupled segments between the at least two electromagnetic coupling use positions into the preferred electromagnetic coupling use position;

wherein the signal applied to each of the multiple sets of conductors is dependent upon the detected configured electromagnetic coupling use position and the determined type of device and the ability of the device to receive a charge.

19. A method in accordance with claim 17, wherein detecting the present electromagnetic coupling use position includes detecting a transition between electromagnetic coupling use positions including a fold of the carrier substrate relative to at least two of the moveably coupled segments; and wherein applying a signal to each of the multiple sets of conductors includes selectively reversing the polarity of the signal being applied to at least one of the sets of conductors.

20. A method in accordance with claim 17, wherein when the carrier substrate is folded across the at least one of the one or more fold lines, the sets of conductors associated with each of the two adjacent segments will overlap at least partially; and wherein when the carrier substrate is unfolded across the at least one of the one or more fold lines, the sets of conductors associated with each of the two adjacent segments will substantially not overlap.

* * * * *